United States Patent [19]

Fort et al.

[11] Patent Number: 5,105,966
[45] Date of Patent: Apr. 21, 1992

[54] MANLID FOR A CONTAINER TANK

[75] Inventors: Edward S. Fort, Clitheroe; Alan G. Smithson, Wetheral, both of England

[73] Assignee: Fort Vale Engineering Limited, Nelson, England

[21] Appl. No.: 662,173

[22] Filed: Feb. 28, 1991

[30] Foreign Application Priority Data

Mar. 2, 1990 [GB] United Kingdom ................. 9004792

[51] Int. Cl.$^5$ .............................................. B65D 45/00
[52] U.S. Cl. ..................................... 220/327; 220/334
[58] Field of Search ............... 220/315, 319, 320, 327, 220/328, 334

[56] References Cited

U.S. PATENT DOCUMENTS

| | | | |
|---|---|---|---|
| 2,873,043 | 2/1959 | Folmsbee | 220/328 X |
| 3,786,955 | 1/1974 | Mowatt-Larssen | 220/327 |
| 3,868,041 | 2/1975 | Knize | 220/324 |
| 4,024,982 | 5/1977 | Schultz | 220/293 |
| 4,411,372 | 10/1983 | Basterfield et al. | 220/327 |

Primary Examiner—Stephen Marcus
Assistant Examiner—Nova Stucker
Attorney, Agent, or Firm—John S. Hale

[57] ABSTRACT

A manlid for a tubular pressure vessel has a one-piece pressed stainless steel skin having an upwardly facing undulating annular groove and a downwardly-facing tapered annular seal groove. The lid assembly is provided with an inner reinforcing member located in the upwardly facing annular groove and an outer, annular peripheral reinforcing member located across the inner reinforcing member and having one arm in abutment with the exterior surface of the seal groove. The inner and outer reinforcing members are formed into a number of angularly-spaced lugs for receipt of conventional threaded swing bolts for securing the manlid in position. The provision of an inner reinforcing member between the pressed skin and the outer reinforcing member allows a pressed skin from a lower pressure-rated manlid to be used in a higher pressure-rated design.

19 Claims, 5 Drawing Sheets

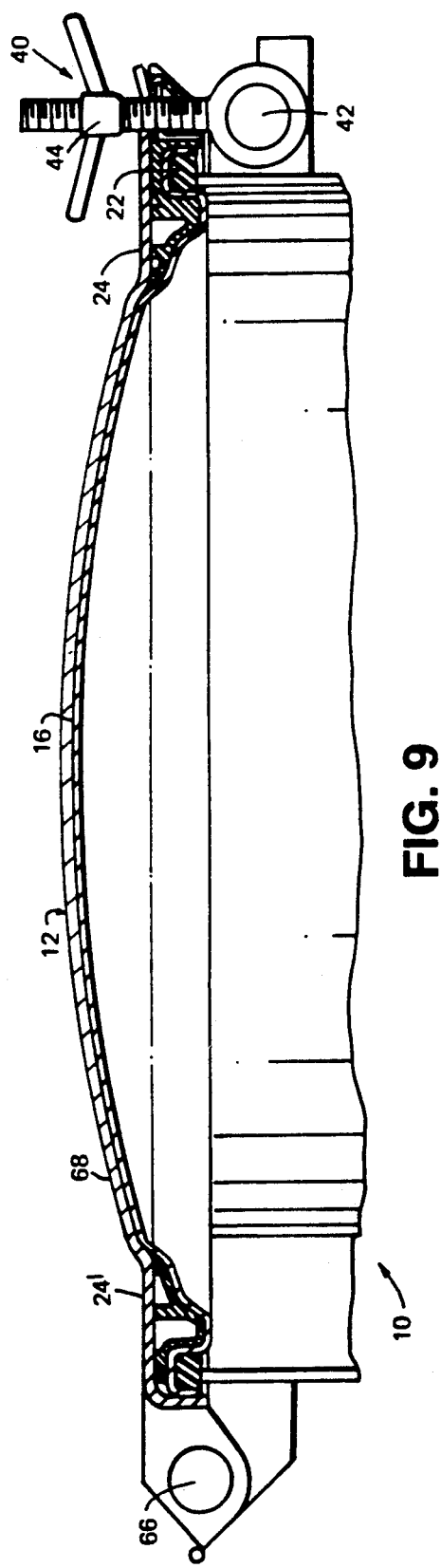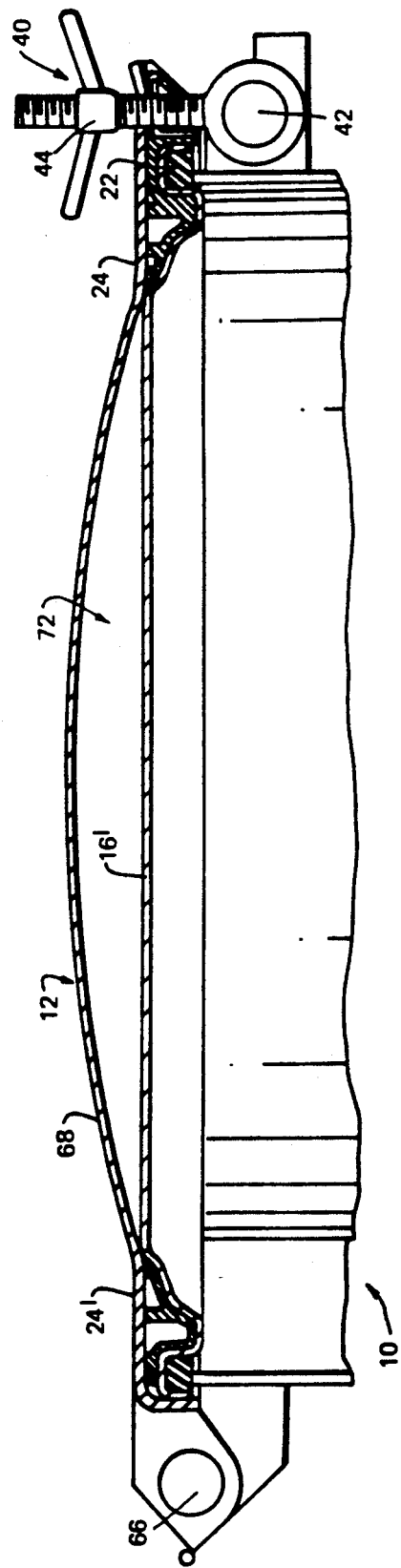

MANLID FOR A CONTAINER TANK

DESCRIPTION

The present invention relates to manlids for container tanks.

Pressure vessels and tanks in general are provided with man lids which typically are circular and are releasably securable to a neck ring which is attached to the vessel. Swing bolt assemblies secured to the neck ring at pivot brackets engage with lugs secured to the lid so as to clamp the lid in sealing engagement with the neck ring. One known man lid is manufactured as a fabrication in which an annular ring is welded around the circumference of a circular domed plate. Swing bolt lugs are welded onto this annular ring and a groove is machined in the annular ring to accommodate a seal. Seal retention is achieved by machining the mouth of the groove narrower than the base of the groove. The domed plate is necessarily of heavy construction in order to withstand the pressures encountered in use and the weld securing it to the annular ring must be of high quality since this too is subjected to the pressure within the vessel. A lid fabricated in this manner is both expensive and time consuming to produce. Another known man-lid is manufactured as a casting. However, this too is expensive to produce.

One known manlid for container tanks which overcomes the problems is disclosed in GB 2098302A, and comprises a one-piece pressed inner skin and an external reinforcing member, the reinforcing member having a part which is L-shaped in cross section and which backs up the base of a seal groove pressed into the inner skin.

However, known manlids, regardless of their construction, are designed to withstand a particular pressure, and if it is necessary to produce a manlid having an increased maximum pressure, it is necessary to re-design the components of the manlid accordingly. This causes problems in the time and expense required in redesigning the components for each manlid design, and also increases the manufacturing costs, since the components for one design will not normally be compatible with those of another design.

It is an object of the present invention to provide a manlid for a container tank which is capable of withstanding increased pressures, but which is still able to use one or more components of a design intended to withstand a lower pressure.

In accordance with the present invention, a manlid for a container tank comprises a one-piece pressed skin having an inturned flange which defines an outer peripheral wall of an annular seal groove formed in the skin by pressing, an inner reinforcing member located on the exterior surface of the pressed inner skin and an outer reinforcing member located on the inner reinforcing member.

The provision of an inner reinforcing member between the pressed skin and the outer reinforcing member allows a pressed skin from a lower pressure-rated manlid to be used in a higher pressure-rated design, with the associated savings in design and manufacturing.

Preferably, the inner and outer reinforcing members are secured to the skin, for example, they may be welded to the skin.

In one embodiment, the pressed skin further comprises a second annular groove radially inward of the annular seal groove and in the exterior surface of the pressed skin, and a portion of the inner reinforcing member is shaped to be received in the second, exterior annular groove. Preferably, the second annular groove and the portion of the inner reinforcing member to be received therein are complementarily shaped.

Preferably, the inner reinforcing member is provided with a plurality of recesses. This both lowers the weight of the first reinforcing member, and provides a much larger area of chill cast skin, with a corresponding improvement in the mechanical properties of the first reinforcing member.

In a preferred embodiment, the inner reinforcing member is formed from a plurality of securable sections, which are preferably identical. This makes manufacture of the inner reinforcing member easier, because it is easier to manufacture a plurality of smaller components rather than a single, large annular reinforcing member. The sections may be releasably securable.

In one embodiment, the outer reinforcing member has a part which is L-shaped in cross-section, part of which comprises an inturned peripheral flange which abuts at least a portion of the exterior of the outer peripheral wall of the seal groove, the inner reinforcing member being located between the other leg of the L-shaped part and the pressed skin.

In one embodiment, at least a portion of the inturned peripheral flange of the outer reinforcing member is formed into one or more securing lugs adapted to be engageable with a retaining member. Preferably, the inner reinforcing member is also provided with one or more lugs corresponding to, and in contact with, the lug or lugs on the outer reinforcing member. Preferably, in the vicinity of the lugs, the inner reinforcing member is provided with an inturned peripheral flange which abuts the exterior of the outer peripheral wall of the seal groove.

Preferably, there is a plurality of lugs on the inner and outer reinforcing members.

By way of example only, specific embodiments of the present invention will now be described, with reference to the accompanying drawings, in which:

FIG. 9 is a side view in part cross-section of a pressure vessel fitted with a third embodiment of lid in accordance with the present invention; and FIG. 10 is a side view in part cross-section of a pressure vessel fitted with a fourth embodiment of lid in accordance with the present invention.

Figure 1:
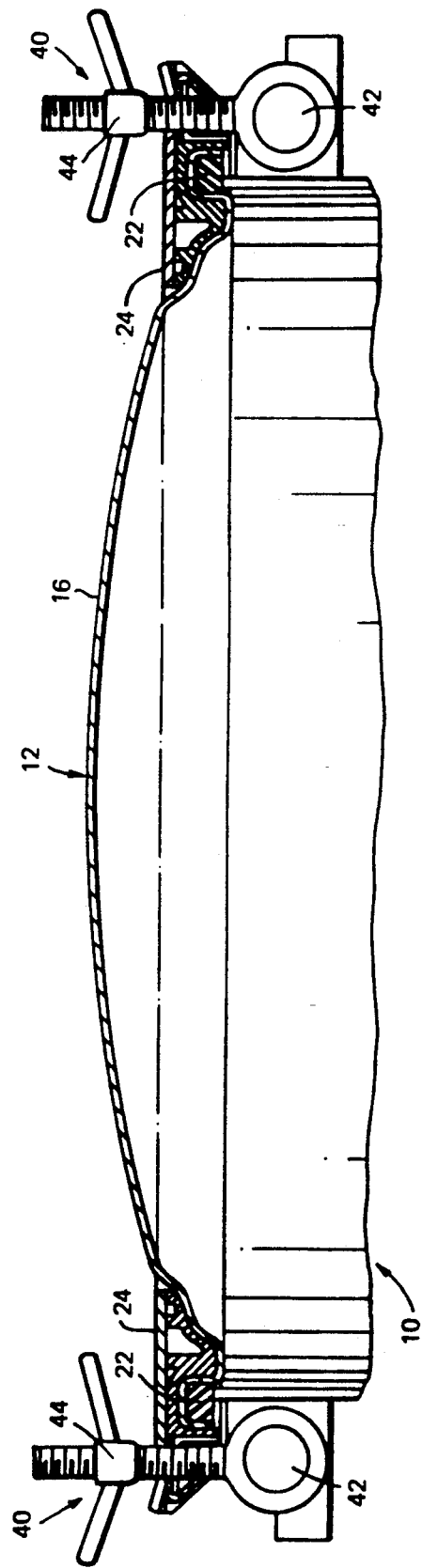
FIG. 1 is a side view in part cross-section of a pressure vessel fitted with a first embodiment of lid in accordance with the present invention.

A pressure vessel typically comprises a tubular drum 10 (part of which is illustrated in FIG. 1) and a lid 12 which is locatable on the upper peripheral rim of the drum 10. The lid comprises a generally domed one-piece stainless steel skin 16 of pressed construction having an upwardly facing undulating peripheral annular groove 18 and a downwardly-facing annular seal groove 20 located radially outwardly of the groove 18 and defined by an outer flange 21. The seal groove 20 has a tapered cross-section with its mouth being narrower than its base, and this serves to retain an annular seal 22 in position within the seal groove (see FIG. 1). In use, when the lid is in a closed position as shown in FIG. 1, the annular seal 22 engages with the upper annular periphery of the tubular drum 10 of the pressure vessel.

The lid assembly is also provided with inner and outer annular, peripheral reinforcing members 23, 24. The outer reinforcing member 24 is generally substantially L-shaped in cross-section, and in use the shorter, downwardly-depending arm 26 of the flange abuts the exterior surface of the radially outer wall defining the seal groove 20 for most of the periphery of the seal groove. The inner reinforcing member is located between the pressed skin 16 and the other arm 30 of the L-shaped member, and will be described in more detail hereinafter. The one-piece skin and the downwardly-depending arm 26 of the outer reinforcing member 24 are secured by a first annular fillet weld 28. The other arm 30 of the outer reinforcing member 24 extends perpendicularly to the arm 26, above the portion of the skin defining the seal groove and the upwardly facing undulating groove 18, and in contact with the inner reinforcing member 23. The radially innermost portion of the arm 28 of the outer reinforcing member 24 and the inner reinforcing member 23 are secured to the one-piece lid skin by means of a second annular weld 32.

Figure 2:
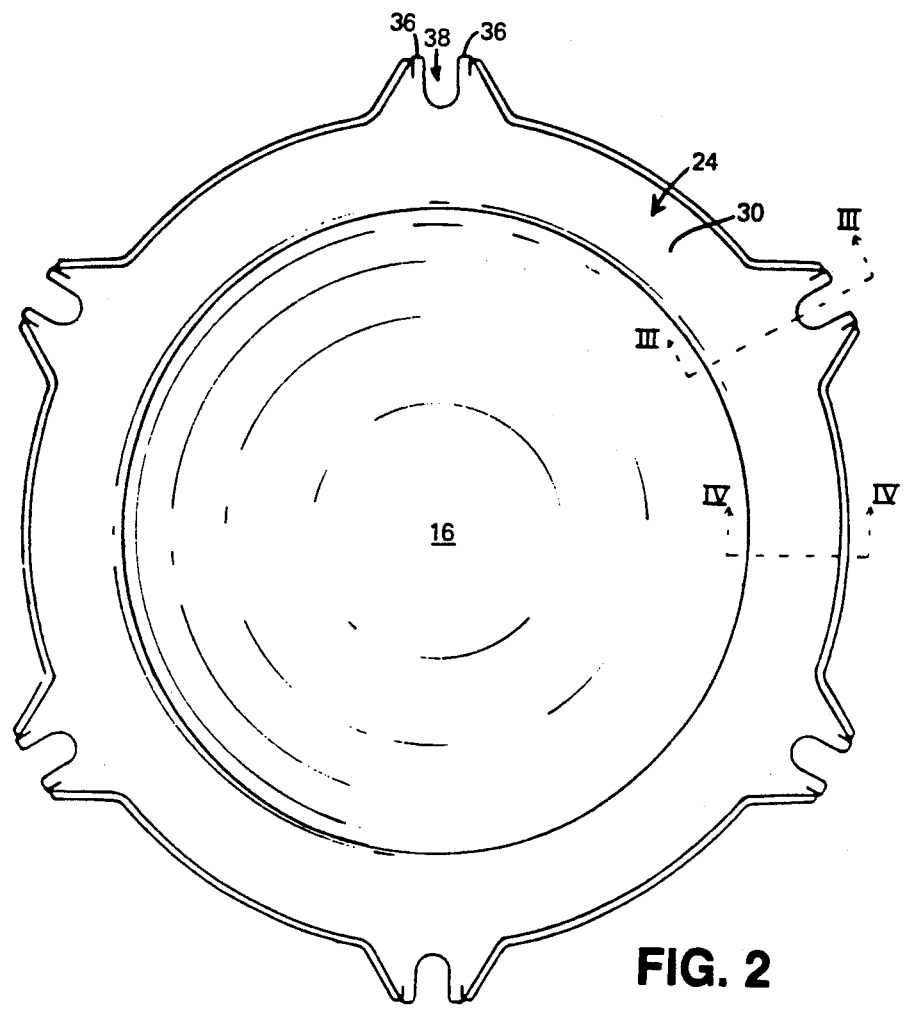
FIG. 2 is a plan view of the lid of FIG. 1.
Figure 3:
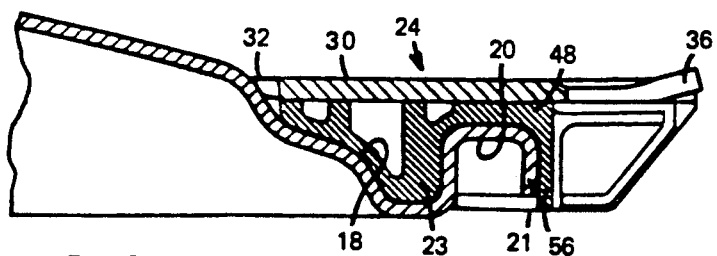
FIG. 3 is an enlarged side elevational cross-section through a securing portion of the lid shown in FIG. 1, in the direction of arrows III—III in FIG. 2.
Figure 4:
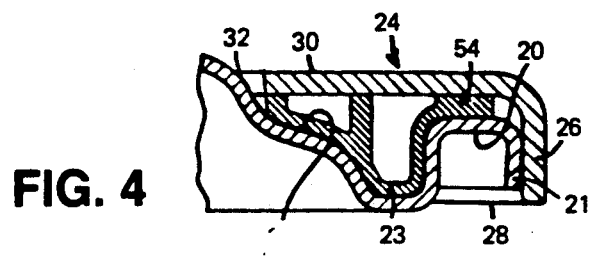
FIG. 4 is a side elevational cross-section through a non-securing peripheral portion of the lid of FIG. 1, in the direction of arrows IV—IV of FIG. 2.
Figure 5:
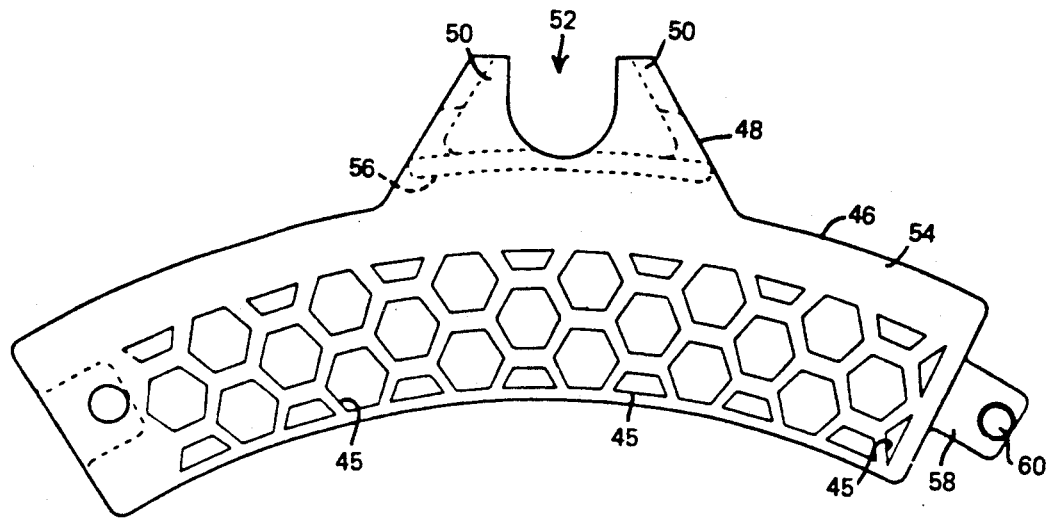
FIG. 5 is a plan view of a reinforcing member forming part of the lid assembly in accordance with the present invention.
Figure 6:
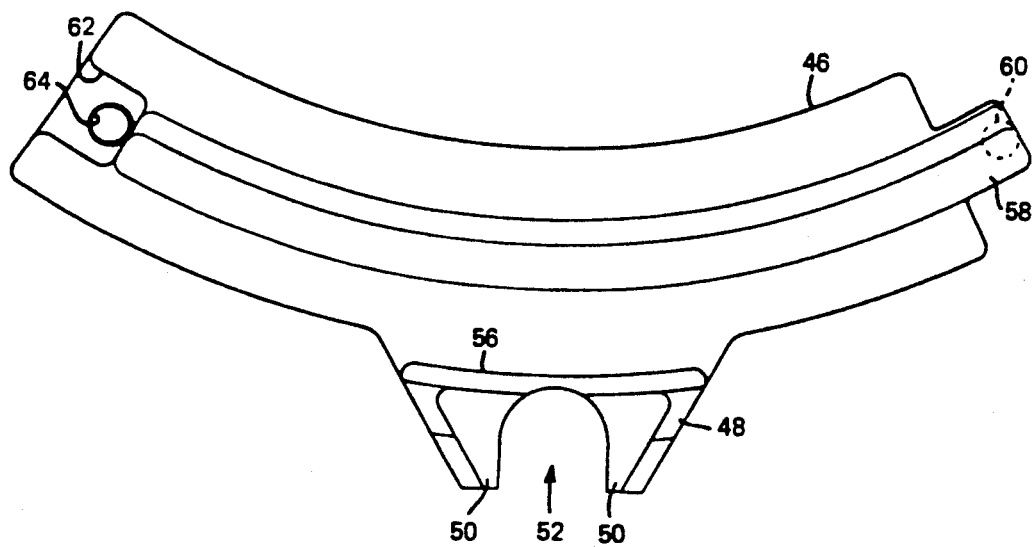
FIG. 6 is an inverted plan view of the component shown in FIG. 4.
Figure 7:
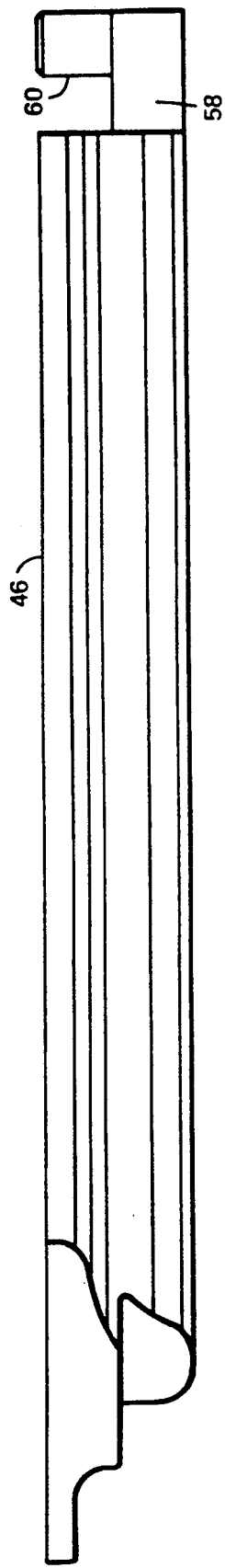
FIG. 7 is a side elevation of the component shown in FIG. 4.

At six locations, equally angularly spaced around the lid, the normally downwardly-extending arm 26 of the outer reinforcing member 24 is formed into two radially outwardly extending lugs 36 separated by a slot 38 which is open radially outwardly (see FIG. 2). Six threaded swing bolts 40 (only two of which are shown in FIG. 1) are each pivotally mounted about a respective pivot 42 to the exterior of the pressure vessel. The pivotal axis of each swing bolt is substantially parallel to the plane of the arm 30 of the outer reinforcing member 24 and extends almost tangentially to the exterior surface of the vessel. The swing bolt may be pivoted through a right angle, from the vertical position shown in FIG. 1 to a horizontal position in which it extends substantially radially with respect to the longitudinal axis of the pressure vessel 10. The swing bolt is generally conventional, and comprises a hand nut 44 which may be advanced along the bolt 40.

In use, when it is desired to secure the lid in position, the lid is lowered onto the drum such that the seal 22 engages the upper periphery of the drum 10, and the swing bolts 40 are swung into their vertical position (as illustrated in FIG. 1), such that they lie in their respective slots 38 between the lugs 36. The hand nuts 44 may then be advanced along the bolts into engagement with the lugs 38, thus keeping the lid securely clamped shut.

With the exception of the arm 26, the outer reinforcing member 24 does not abut the one-piece skin 16. Instead, the further, inner, reinforcing member 23 is located in the undulating recess 18 in contact with the one-piece skin, and the arm 30 of the outer reinforcing member 24.

The inner reinforcing member 23 is annular, but is constructed from six separate, identical arcuate pieces 46. Each one is provided with a radially outwardly extending flange 48. The flange comprises two lugs 50 defining a slot 52 therebetween, and the lugs 50 and 52 correspond with, and are designed to align with, the lugs 36 and slots 38 in the reinforcing ring 24.

Each piece of the inner reinforcing member 23 is identical and forms one sixth of an arc of an annulus, and, as seen from the Figures, they are not completely solid, but are provided with a plurality of recesses 45 in a honeycomb-type array. The shape of the recesses is shown in the Figures, and it will also be noted that the undersurface of each portion of the inner reinforcing member is complementarily shaped to the shape of the undulating groove 18, to be received in the undulating annular groove 18 of the one-piece inner skin of the lid.

Each portion of the inner reinforcing member is chill cast, and the very much larger surface area provided by the recesses produces a much larger area of chill cast skin, with a corresponding improvement in the mechanical properties of the finished article. The large number of recesses also reduces the weight when compared with a solid article, thus facilitating handling and also reducing the material cost, without significantly reducing the strength.

It will be noted that for most of the angular extent of each portion of the inner reinforcing member, the radially outermost portion is that portion 54 of the member which lies on top of the base of the seal groove. However, as mentioned above, the flange of each piece is formed, radially inwardly of the slot 52 at its angular centre with two radially outwardly directed reinforcing lugs defining an aperture therebetween, corresponding to the lugs 36 and slots 38 of the outer reinforcing member 24 respectively. It will also be noted that in the vicinity of the reinforcing flanges, a downwardly-depending arcuate wall 56 is provided, which abuts the exterior surface of the radially outer wall which forms the seal groove 20. This is provided since the downwardly-depending arm 26 of the outer reinforcing member 24 which normally abuts the seal groove wall is deformed to provide the lugs 36 and slots 38. The wall 56 on the inner reinforcing member 46 thus provides the reinforcement in this vicinity.

One end of each portion of the inner reinforcing member is provided with a tongue 58 which is itself provided with an upstanding cylindrical boss 60. The opposite end of each portion is provided with a recess 62 in its undersurface, and which is shaped complementarily with the tongue. The recess is also provided with a further cylindrical recess 64 which is adapted to receive the cylindrical boss. In use, the annular inner reinforcing member 23 is formed by fitting together six of the aforementioned portions 46.

The assembled inner reinforcing member is located as illustrated on the one-piece skin, and the outer reinforcing member 24 is placed on top, with its securing lugs corresponding with the securing lugs of the inner reinforcing member 46. The welds 28, 32 are then made, and the lid is thus ready for use. It should be noted that the weld 32 also secures the inner reinforcing member 23 to the skin 16.

Figure 8:
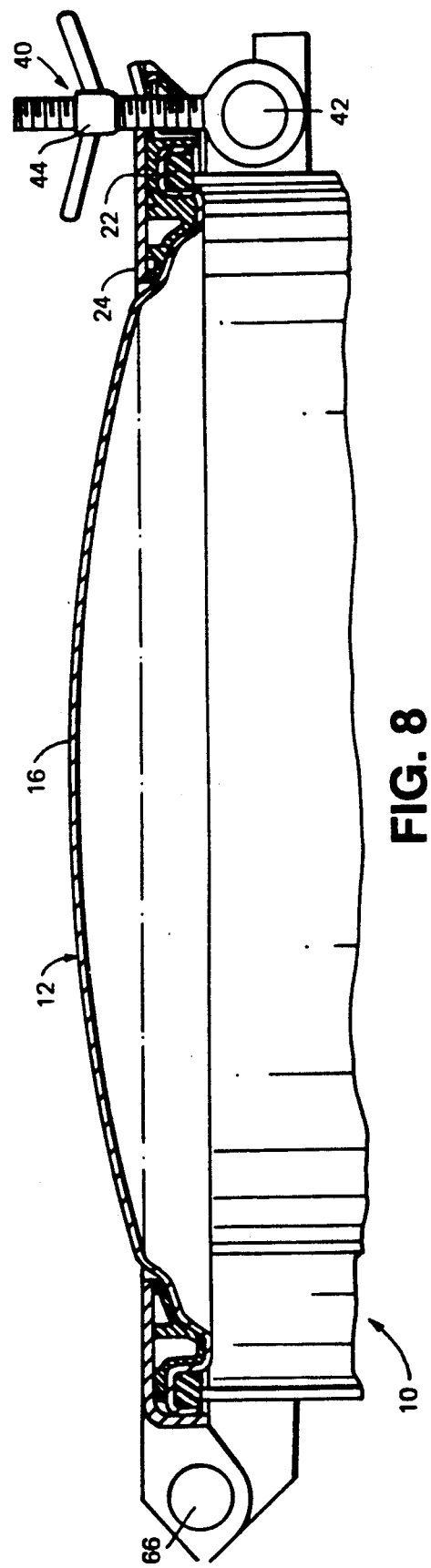
FIG. 8 is a side view in part cross-section of a pressure vessel fitted with a second embodiment of lid in accordance with the present invention.

A modified embodiment is shown in FIG. 8. The construction is identical to that of the first embodiment, with the exception that the lid 12 is pivotally attached at pivot 66 to the vessel 10. Thus, instead of lifting and lowering the lid 12, it is merely hingedly moved open and shut. It should be noted that, for purposes of simplicity, only one swing bolt has been shown, whereas, in fact, six are provided at equally-spaced locations around the periphery of the lid.

The above examples show the outer reinforcing member 24 in the form of a ring attached only to the periphery of a pressed skin 16. However, as shown in FIG. 9, another embodiment has an outer reinforcing member 68 with an L-shaped periphery 24' located as in the previous embodiments and a central domed portion extending over, and in contact with the whole of the domed portion of the pressed skin 16, which is identical to that of the embodiment of FIG. 8, as is the inner reinforcing member 23 and all the other components, except that the weld 32 only secures the inner reinforcing member 23, and the same reference numerals are used therein.

A further embodiment is illustrated in FIG. 10, in which an outer reinforcing member 70 is identical to that of FIG. 9, but the central portion of the pressed skin 16' is flat instead of domed, thereby forming an insulating space 72 between the skin and the outer reinforcing member. As for the previous embodiment, all other components are otherwise identical, except that weld 32 only secures the inner reinforcing member, and the same reference numerals are used therein.

The invention is not restricted to the details of the foregoing embodiments. For example, the number of securing swing bolts may be varied from one upwards as required, and typically from three to twelve securing swing bolts will be provided.

The present invention allows the same one-piece pressing 16 to be used at higher loads, and removes the need for producing a separate main pressing for each load.

We claim:

1. A manlid for a container tank, comprising:
   a one-piece pressed skin;
   an annular seal groove in said pressed skin having an outer peripheral wall defined by an inturned flange of said pressed skin;
   an inner reinforcing member located on an exterior surface of said pressed skin and being welded thereto; and
   an outer reinforcing member located on said inner reinforcing member and being welded to said skin.

2. A manlid as claimed in claim 1, wherein said pressed skin further comprises a second annular groove radially inward of said annular seal groove and in said exterior surface of said pressed skin, a portion of said inner reinforcing member being shaped to be received in said second, exterior annular groove.

3. A manlid as claimed in claim 2, wherein said second annular groove and said portion of said inner reinforcing member to be received therein are complementarily-shaped.

4. A manlid as claimed in claim 1, wherein said inner reinforcing member is provided with a plurality of recesses in its surface.

5. A manlid as claimed in claim 1, wherein the inner reinforcing member is formed by chill casting.

6. A manlid as claimed in claim 1, wherein said inner reinforcing member comprises a plurality of securable sections.

7. A manlid as claimed in claim 6, wherein said sections of said inner reinforcing member are substantially identical.

8. A manlid as claimed in claim 6, wherein said sections are releasably securable together.

9. A manlid as claimed in claim 6, wherein each end of said securable sections is shaped to engage complementarily with the corresponding ends of the adjacent securable sections.

10. A manlid as claimed in claim 9, wherein one end of each of said sections is provided with a projection, and the other end of each of said sections is provided with a complementarily-shaped recess.

11. A manlid as claimed in claim 10, wherein each of said projections is provided with a lug which is shaped to be received in a complementarily-shaped further recess in the vicinity of said first recess.

12. A manlid as claimed in claim 1, wherein said outer reinforcing member has a part which is L-shaped in cross-section, one leg of which comprises an inturned peripheral flange which abuts at least a portion of the exterior of said outer peripheral wall of said seal groove, said inner reinforcing member being located between the other leg of said L-shaped part and said pressed skin.

13. A manlid as claimed in claim 12, wherein at least a portion of said inturned peripheral flange of said outer reinforcing member is formed into one or more securing lugs adapted to be engageable with a retaining member.

14. A manlid as claimed in claimed in claim 13, wherein said inner reinforcing member is also provided with one or more lugs corresponding to, and in contact with, the lug or lugs on said outer reinforcing member.

15. A manlid as claimed in claim 13, wherein, in the vicinity of the said one or more securing lugs, said inner reinforcing member is provided with an inturned peripheral flange which abuts the exterior of said outer peripheraal wall of said seal groove.

16. A manlid as claimed in claim 13, comprising a plurality of lugs on said inner and outer reinforcing members.

17. A manlid as claimed in claim 1, wherein said seal groove has a tapered cross-section with its mouth narrower than its base.

18. A manlid as claimed in claim 1, comprising means for hinged attachment to a container tank.

19. A manlid for a container tank, comprising, a one-piece pressed skin;
   an annular seal groove in said pressed skin, having an outer peripheral wall defined by an inturned flange of said pressed skin;
   a second annular groove in an exterior surface of said pressed skin radially inwardly of said annular seal groove;
   an inner reinforcing member located on said exterior surface of said pressed skin and being welded thereto, a portion of said inner reinforcing member being shaped to be received in said second annular groove;
   an outer reinforcing member located on said inner reinforcing member and being welded to said pressed skin, and having a part which is L-shaped in cross-section, one leg of which abuts at least a portion of the exterior of said peripheral wall of said seal groove and said inner reinforcing member being located between the other leg of said L-shaped part and said pressed skin.

* * * * *